G. W. HALLEY.
FISH NET AND TENT FRAME.
APPLICATION FILED FEB. 24, 1914.
1,158,489.
Patented Nov. 2, 1915.
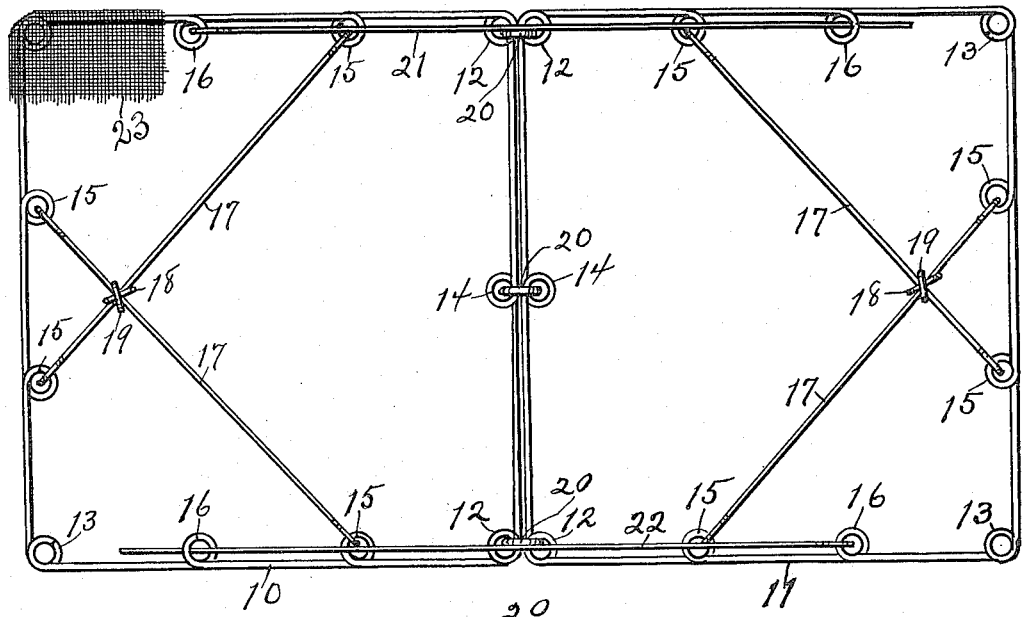
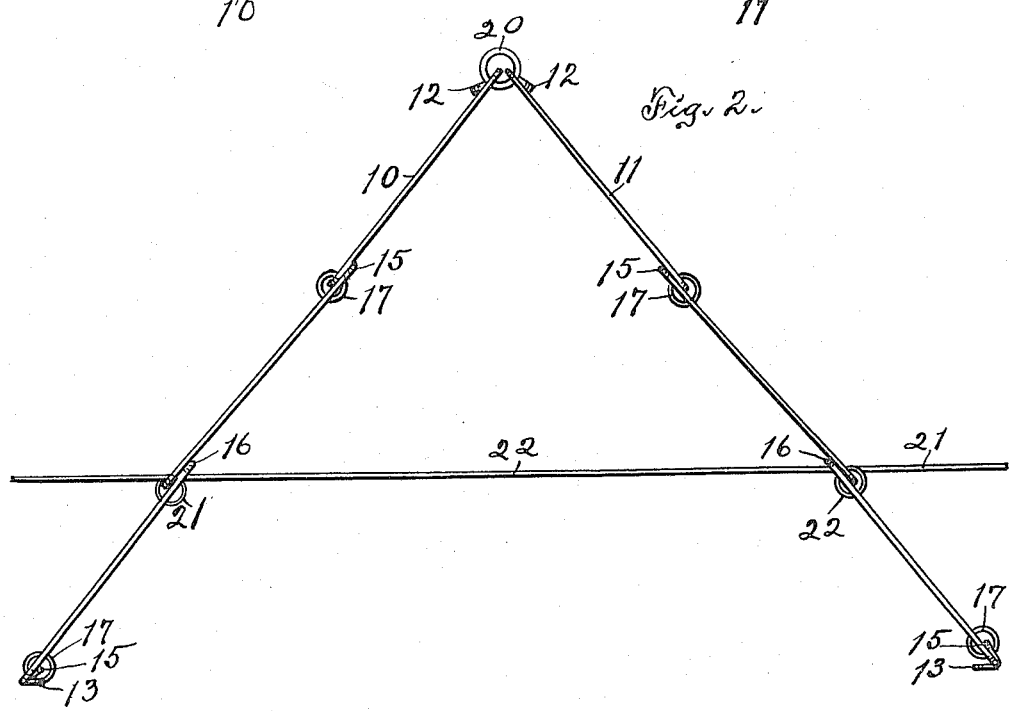
Attest:
H. J. Sweet.
S. C. Sweet.
Inventor:
George W. Halley

UNITED STATES PATENT OFFICE.

GEORGE W. HALLEY, OF NEVADA, IOWA.

FISH-NET AND TENT FRAME.

1,158,489.  Specification of Letters Patent.  Patented Nov. 2, 1915.

Application filed February 24, 1914. Serial No. 820,412.

*To all whom it may concern:*

Be it known that I, GEORGE W. HALLEY, citizen of the United States of America, and resident of Nevada, Story county, Iowa, have invented a new and useful Fish-Net and Tent Frame, of which the following is a specification.

The object of this invention is to provide an improved frame for a fishing net or tent, adapted to be covered with netting or canvas.

My invention consists in the construction, arrangement and combination of elements hereinafter set forth, pointed out in my claims and illustrated by the accompanying drawing, in which—

Figure 1 is a plan of the frame extended, the netting being broken away. Fig. 2 is an end elevation of the frame on a different scale from Fig. 1 and inverted as required to adapt it for use in supporting a tent canvas.

In the construction of the device as shown the numerals 10, 11, designate counterpart frames, which preferably are made of round wire or metal rods. Each frame 10, 11, may be endless or jointed as desired in respect to its perimeter. Each frame 10, 11, preferably is formed with eyes or loops 12, 13 at its corners, another eye or loop 14 at the center of one side, and other eyes or loops 15, 16 in spaced relations on its remaining sides; which eyes or loops preferably are integral and adapted to receive auxiliary devices as hereinafter set forth. The eyes or loops 15 are connected by crossed brace rods 17, and said brace rods are further connected by interlocking eyes or loops 18, 19 formed in them. The frames 10, 11 are placed side by side and are pivotally connected by rings 20 loosely extending through the eyes 14 and embracing adjacent sides of said frames. Thus provision is made for articulating the frames 10, 11. A rod 21 is pivoted at one end to an eye 16 on one frame 10, extends over the axis of articulation of the frames and through an eye 16 on the alining side of the frame 11. A rod 22 is pivoted to the opposite eye 16 of the frame 11 at one end, extends over the axis of articulation of the frames and through an eye 16 on the alining side of the frame 10. The rods 21, 22 are in approximately parallel planes and are adapted for rectilinear reciprocation through eyes 16 alining or registering at times with the eyes to which they are pivoted. Netting 23, of any suitable character, is extended across the frames 10, 11 and secured to the outer, non-abutting, sides thereof. The netting also is secured, by extensions beyond the alining sides of the frames, to the end rods 21, 22, preferably by placing said end rods through meshes or loops of marginal portions of said extensions in such manner that said rods may slide through the connections in use. Draft means, such as ropes or hooks not shown, may be secured to the eyes or loops 13 for the purpose of raising and lowering the frame and net in water. Bait may be attached to the central ring 20 to attract fish into the net when said net is in flat or extended position or supported on the bottom of basin or stream containing it. When draft upward is applied to the eyes or loops 13, the frame flexes in rings 20 and the end rods 21, 22 raise margins of the net above the lowermost parts of the frame, thus forming a scoop, basket or container within which fish may be brought to the surface and taken.

When not desired for use in catching fish, the net and frames may be inverted as shown and adjusted in A-form on land, which done a canvas tent, not shown, may be placed thereon and be supported thereby. The tent canvas will protect the net as well as the operators or users, camp equipage and other supplies.

I claim as my invention:—

1. A fish net, comprising hinged frames, end rods pivotally and slidingly mounted on and crossing the hinge of said frames, a net secured to said frames and rods, and means for flexing and raising said frames.

2. A fish net and tent frame, comprising braced metal frames hinged together, and end rods pivoted to one frame each, said rods being extended across the hinge line of the frames and slidingly engaging the frame opposite the pivotal connections.

3. A frame formed of metal skeleton members hinged together, each frame member being formed with eyes or loops adapted to receive auxiliary devices, such as braces, rods and hangers, and end rods pivotally and slidingly mounted on said frame members and crossing the hinge there.

Signed by me at Nevada, Iowa, this eighteenth day of February, 1914.

GEORGE W. HALLEY.

Witnesses:
 FRED E. HANSEN,
 S. C. SWEET.

Copies of this patent may be obtained for five cents each, by addressing the "Commissioner of Patents, Washington, D. C."